(12) United States Patent
Lee

(10) Patent No.: US 10,037,694 B2
(45) Date of Patent: Jul. 31, 2018

(54) METHOD AND SYSTEM FOR AUTONOMOUS VEHICLES TO PASS THROUGH ROAD INTERSECTION SAFELY

(71) Applicants: Passion Mobility Ltd., Taipei (TW); Chunghsin Lee, Las Vegas, NV (US)

(72) Inventor: Chunghsin Lee, Las Vegas, NV (US)

(73) Assignee: Passion Mobility Ltd., Taipei (TW)

( * ) Notice: Subject to any disclaimer, the term of this patent is extended or adjusted under 35 U.S.C. 154(b) by 8 days.

(21) Appl. No.: 15/281,407

(22) Filed: Sep. 30, 2016

(65) Prior Publication Data

US 2018/0096596 A1    Apr. 5, 2018

(51) Int. Cl.
| G08G 1/0967 | (2006.01) |
| G05D 1/00 | (2006.01) |
| G05D 1/02 | (2006.01) |
| G08G 1/00 | (2006.01) |
| G08G 1/137 | (2006.01) |
| G08G 1/16 | (2006.01) |

(52) U.S. Cl.
CPC ..... *G08G 1/096725* (2013.01); *G05D 1/0088* (2013.01); *G05D 1/0278* (2013.01); *G05D 1/0289* (2013.01); *G08G 1/137* (2013.01); *G08G 1/162* (2013.01); *G08G 1/207* (2013.01)

(58) Field of Classification Search
CPC .... G08G 1/096725; G08G 1/62; G08G 1/207; G08G 1/137; G05D 1/0088; G05D 1/0278; G05D 1/0289
See application file for complete search history.

(56) References Cited

U.S. PATENT DOCUMENTS

| 8,996,226 B1* | 3/2015 | Chatham | G08G 1/09626 |
| | | | 701/117 |
| 9,701,306 B2* | 7/2017 | Prokhorov | B60W 30/09 |
| 2016/0318490 A1* | 11/2016 | Ben Shalom | B60T 7/12 |
| 2017/0057514 A1* | 3/2017 | Toyoda | B60W 30/18154 |
| 2017/0221366 A1* | 8/2017 | An | G08G 1/0965 |
| 2017/0262709 A1* | 9/2017 | Wellington | G06K 9/00791 |

\* cited by examiner

*Primary Examiner* — Mussa A Shaawat
(74) *Attorney, Agent, or Firm* — Alan D. Kamrath; Kamrath IP Lawfirm, P.A.

(57) ABSTRACT

A method and a system for at least two autonomous vehicles to safely pass through a road intersection are provided. The method includes providing an information receiving circle in each of the maps circling the road intersection, providing a broadcasting circle circled by the information receiving circle concentrically, circling a road intersection, traveling all autonomous vehicles toward the road intersection and into the information receiving circle, traveling one of the autonomous vehicles into the broadcasting circle for broadcasting traffic information, receiving traffic information of the autonomous vehicle traveling in the broadcasting circle by the other autonomous vehicle, and determining which autonomous vehicle passes through the road intersection first according to the traffic information broadcasted by the autonomous vehicle. When the other autonomous vehicle makes a determination to let the autonomous vehicle pass first, the other autonomous vehicle stops before the intersection until the autonomous vehicle has passed through the road intersection.

20 Claims, 6 Drawing Sheets

METHOD AND SYSTEM FOR AUTONOMOUS VEHICLES TO PASS THROUGH ROAD INTERSECTION SAFELY

FIELD OF THE INVENTION

The present invention relates to a method and a system for autonomous vehicles to pass through road intersections safely. More particularly, the present invention relates to a method and a system for autonomous vehicles to pass through road intersections safely by broadcasting and receiving the traffic information of the autonomous vehicles traveling on the road.

BACKGROUND OF THE INVENTION

Autonomous cars, or self-driving cars, or driverless cars have been the subject of extensive research and development in recent years. Many big technology companies such as Google, Baidu, and most major car companies including General Motor, Mercedes Benz, and BMW have devoted a lot of resources in this area. All deal with autonomous cars that can travel on public roads and also at highway speeds (more than 40 km/hr). To achieve this requirement, the cars have to be fitted with many expensive sensors to get an understanding of its surroundings. Autonomous cars also keep in constant communication with others and also with a central station to keep tabs on them on the roads close by. For small communities, autonomous cars generally travel at lower speeds (less than 40 km/hr) and the surrounding is less complicated. Less expensive sensors are used and resulted in more reasonably price vehicles. To keep economic factors in mind, a method for autonomous vehicles to be aware of other autonomous vehicles nearby without talking to them directly and without a central station's help, and for making decisions locally without the help of central station and without communicating with other vehicles is strongly needed. This is especially important when traveling through road intersections.

For autonomous cars to go through road intersections whether it is 3-way, 4-way, or more intersection, it is necessary for the autonomous cars to know the position of other autonomous cars to prevent collisions. Traditionally it is for the cars to communicate with each other directly, or have a central station to notify the position of each car.

SUMMARY OF THE INVENTION

We propose a way to have each autonomous car decide which car will go first at road intersections, without central station intervention or having cars talking to each other. To overcome the shortcomings of the prior methods for autonomous vehicles crossing road intersections, a method of the present invention is provided for at least two autonomous vehicles to safely pass through a road intersection. The location of the road intersection is stored in a map installed in a computer of each of the autonomous vehicles. Each of the computers of the autonomous vehicles has a communication module capable of broadcasting and receiving traffic information. The road intersection is where a plurality of roads meets. The method includes providing an information receiving circle in each of the maps circling the road intersection, providing a broadcasting circle in each of the maps circling the road intersection, in which each of the broadcasting circles is circled by each of the information receiving circles in each of the maps concentrically, traveling all autonomous vehicles toward the road intersection and into the information receiving circle, traveling one of the autonomous vehicles further into the broadcasting circle for broadcasting traffic information via the computer thereof, receiving traffic information of the autonomous vehicle traveling in the broadcasting circle by the computer of the other autonomous vehicle, and determining which autonomous vehicle passes through the road intersection first according to the traffic information of the autonomous vehicle broadcasted, by the computer of the other autonomous vehicle that receives the traffic information broadcasted by the autonomous vehicle, wherein when the computer of the other autonomous vehicle makes a determination to let the autonomous vehicle pass first, the other autonomous vehicle stops before the intersection until the autonomous vehicle has passed through the road intersection.

BRIEF DESCRIPTION OF THE DRAWINGS

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

Figure 1:
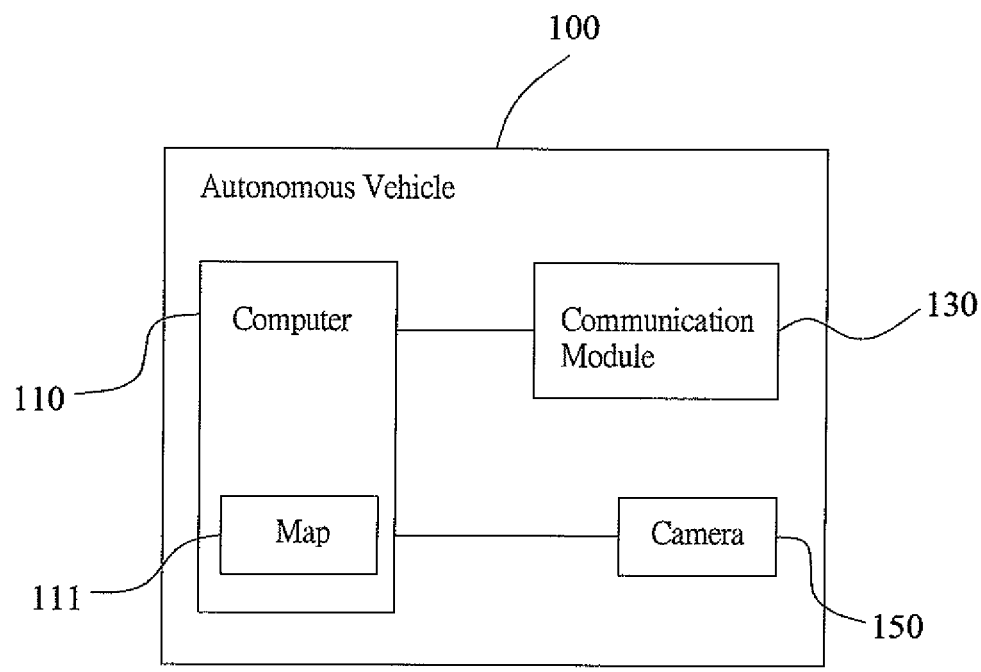
FIG. 1 is a schematic diagram illustrating an autonomous vehicle according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts. It is not intended to limit the method or the system by the exemplary embodiments described herein. In the following detailed description, for purposes of explanation, numerous specific details are set forth in order to attain a thorough understanding of the disclosed embodiments. It will be apparent, however, that one or more embodiments may be practiced without these specific details. As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items. It will be understood that when an element is referred to as being "connected" to another element, it can be directly connected to the other element or intervening elements may be present. In contrast, when an element is referred to as being "directly connected" to another element, there are no intervening elements present.

A system for two or more autonomous vehicles to safely pass through a road intersection in accordance with the present invention is disclosed. The system is applicable to a plurality of roads that meet at the road intersection. The system has at least two autonomous vehicles travelling on different roads toward the same road intersection, respectively.

Referring to FIG. 1, FIG. 1 is a schematic diagram illustrating an autonomous vehicle 100 according to an embodiment of the present invention. All autonomous vehicles 100 of the present invention include a computer 110, a communication module 130 and, optionally, a camera 150. The computer 110 has a map 111 installed in it. According to some embodiments of the present invention, the map 111 may be a map of an enclosed area such as a vacation resort or a retirement community, and the autonomous vehicle 100 may be an autonomous shuttle bus providing shuttle services in those enclosed areas. The computer 110 of the autonomous vehicles 100 may contain traveling status and information such as the traveling speed, the position information, the traveling direction, the identification such as the license plate number, and the length of the vehicle. The position information can be obtained via global positioning system (GPS), triangulation by using mobile base stations, or any other positioning technologies applicable. The communication module 130 of each autonomous vehicle 100 is applied for receiving traffic information broadcasted from one another autonomous vehicle, and broadcasting traffic information of itself to other autonomous vehicles. The aforementioned traffic information can be broadcasted and received via infrared, direct-broadcast satellite, Wi-Fi, Bluetooth, 4G communication, 3G communication, or any other feasible wireless communication technologies. Besides, the camera 150 of each autonomous vehicle 100 can be connected to the computer 110. When the computer 110 detects an obstacle (figure not shown) blocking in front of the autonomous vehicle 100, the computer 110 may determine to stop the autonomous vehicle immediately until the obstacle is no longer detected. By operating with the camera 150, collisions with obstacles such as a pedestrian that rushes into the road may be prevented.

Figure 2:
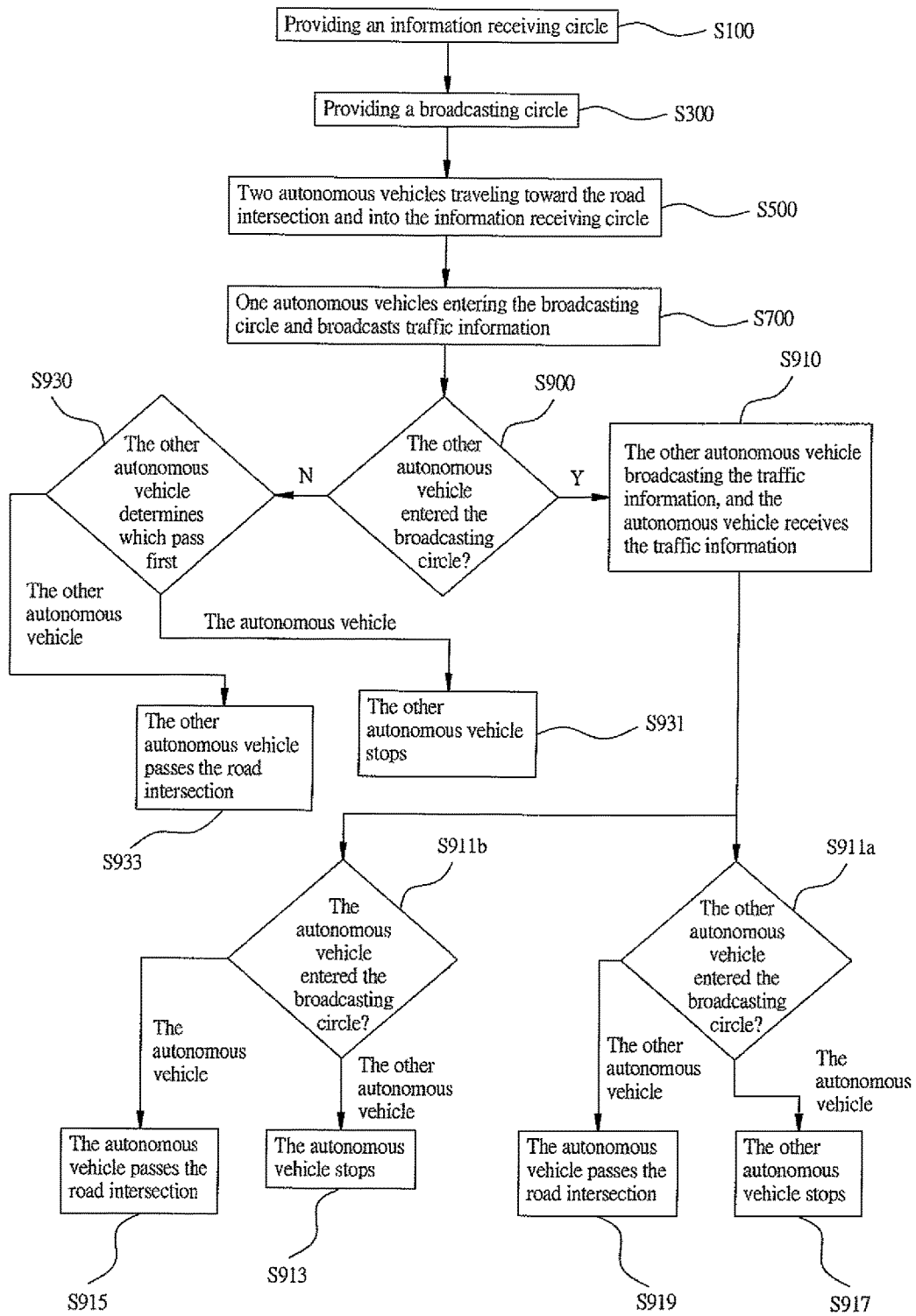
FIG. 2 is a workflow illustrating a method for at least two autonomous vehicles to safely pass through a road intersection according to an embodiment of the present invention.
Figure 3:
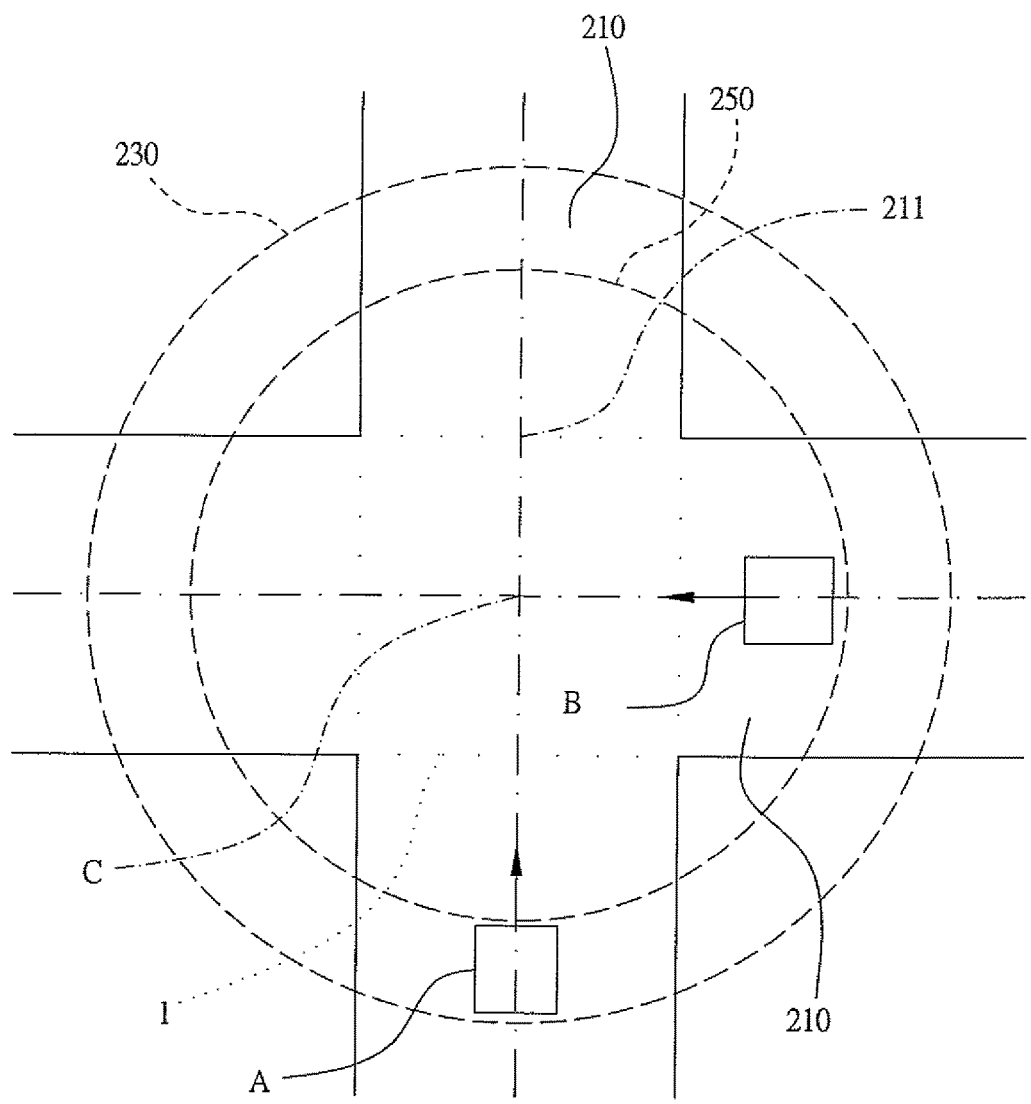
FIG. 3 is a schematic diagram showing two autonomous vehicles traveling toward a road intersection, in which one of the autonomous vehicles is located in an information receiving circle, and the other autonomous vehicle is located in an broadcasting circle, according to an embodiment of the present invention.

Now refer to FIG. 2 and FIG. 3. FIG. 2 is a workflow illustrating a method for at least two autonomous vehicles to safely pass through a road intersection according to an embodiment of the present invention, and FIG. 3 is a schematic diagram showing two autonomous vehicles traveling toward a road intersection, where one of the autonomous vehicles is located in an information receiving circle, and the other autonomous vehicle is located in a broadcasting circle, according to an embodiment of the present location of a road intersection I is stored in the map 111 of each autonomous vehicle 100. The road intersection I is where the roads 210 meet.

For better exemplifying the following embodiment of the present invention, at least two autonomous vehicles 100 are traveling on the roads 210, hereinafter autonomous vehicle A and autonomous vehicle B. In addition, the two roads 210 meet at the road intersection I. It is worth mentioning that the number of the autonomous vehicles depicted herein should not be limiting the scope of the claimed invention; the method and system of the present invention are fully applicable to an entire autonomous vehicle flow traveling on roads and toward the same road intersection.

Referring to FIG. 2, when the autonomous vehicle A and the autonomous vehicle B approach a road intersection I, two imaginary circles will be indicated on the map 111 by the computer 110. Specifically, in step S100, the map 111 of each autonomous vehicle A and autonomous vehicle B defines an information receiving circle 230 while approaching the road intersection I. Then, in step S300, the map 111 of each autonomous vehicle A and autonomous vehicle B defines a broadcasting circle 250 while approaching the road intersection I. In some embodiments, the information receiving circle 230 and the broadcasting circle 250 can be defined simultaneously. The road intersection I is circled by the information receiving circle 230. The information circle 230 is circled by the broadcasting circle 250 concentrically. Both the broadcasting circle 250 and the information receiving circle 230 are concentric with the center C of the road intersection I. That center C of the road intersection I is defined by the middle line 211 of each road 210. The center C of the road intersection I is where at least two of the middle lines 211 meet. The sizes of the broadcasting circle 250 and the information receiving circle 230 may vary upon the speed of each autonomous vehicle, in this instance, the autonomous vehicle A and the autonomous vehicle B. Both the broadcasting circle 250 and the information receiving circle 230 expand to become larger as the speed of the autonomous vehicle increases, whereas both the broadcasting circle 250 and the information receiving circle 230 shrink to become smaller as the speed of the autonomous vehicle decreases.

Next, in step S500, both the autonomous vehicle A and the autonomous vehicle B advance into the information receiving circle 230, and initiate reception of any traffic information broadcasting from each other, and from other autonomous vehicles if any. According to the present embodiment, the autonomous vehicle B then enters the broadcasting circle 250, and starts broadcasting its traffic information to the air (see step S700). In step S900, when the autonomous vehicle A is located inside the information receiving circle 230 and has not yet entered the broadcasting circle 250, step S930 is performed. The autonomous vehicle A receives the broadcasted traffic information and processes the traffic information via its computer 110. The computer 110 of the autonomous vehicle A determines which autonomous vehicle passes the road intersection I first according to the traffic information broadcasted from the autonomous vehicle B; the priority of who passes the road intersection I first can be determined by the distance, speed, or other factors. If the computer 110 of the autonomous vehicle A determines that the autonomous vehicle B should pass the road intersection I first, step S931 will be performed and the autonomous vehicle A stops before the road intersection I to let the autonomous vehicle B pass first. On the contrary, in step S933, if the computer 110 of the autonomous vehicle A determines that the autonomous vehicle A itself should pass the road intersection I first, the autonomous vehicle A keep advances for passing the road intersection I, and the autonomous vehicle B is stopped before the road intersection I. Alternatively, the autonomous vehicle B can be stopped right away for letting the autonomous vehicle A pass the road intersection I. There are numerous alternative embodiments of determining the priority set forth as follows.

According to an embodiment of the present invention, the computer 110 of the autonomous vehicle A determines which autonomous vehicle passes through the road intersection I first by comparing the times left before each of the autonomous vehicle A and the autonomous vehicle B reaches the road intersection I. For instance, though the autonomous vehicle A is farther than the autonomous vehicle B from the road intersection I, they might be traveling in different speeds. When the time left before entering the road intersection I for the autonomous vehicle B is shorter than the time left before entering the road intersection I for the autonomous vehicle A, which is calculated by the computer 110 of the autonomous vehicle A, the computer 110 of the autonomous vehicle A determines to stop before the road intersection I to let the autonomous vehicle B pass first.

In some embodiments, the autonomous vehicle A may stop at the edge of the broadcasting circle 250, until the autonomous vehicle B has passed through the road intersection I. There can be many ways for the autonomous vehicle A to determine when to advance further after the autonomous vehicle B has passed through the road intersection I, and vice versa. For instance, as mentioned above, the traffic information contains the length of the autonomous vehicles. The traffic information of the autonomous vehicle B received by the autonomous vehicle A may be processed and calculated by the computer 110 of the autonomous vehicle A. The timing of when the most rear side of the autonomous vehicle B leaves the road intersection I may be predicted by the computer 110 of the autonomous vehicle A. Once the most rear side of the autonomous vehicle B leaves the road intersection I, the autonomous vehicle A continues to advance toward the road intersection I.

For another instance, after the autonomous vehicle B passes through the road intersection I and leaves the broadcasting circle 250, it stops broadcasting. Under this scenario, the autonomous vehicle A will no longer receive traffic information from autonomous vehicle B, thus determining that the autonomous vehicle B no longer exists and continuing advancing.

Figure 4:
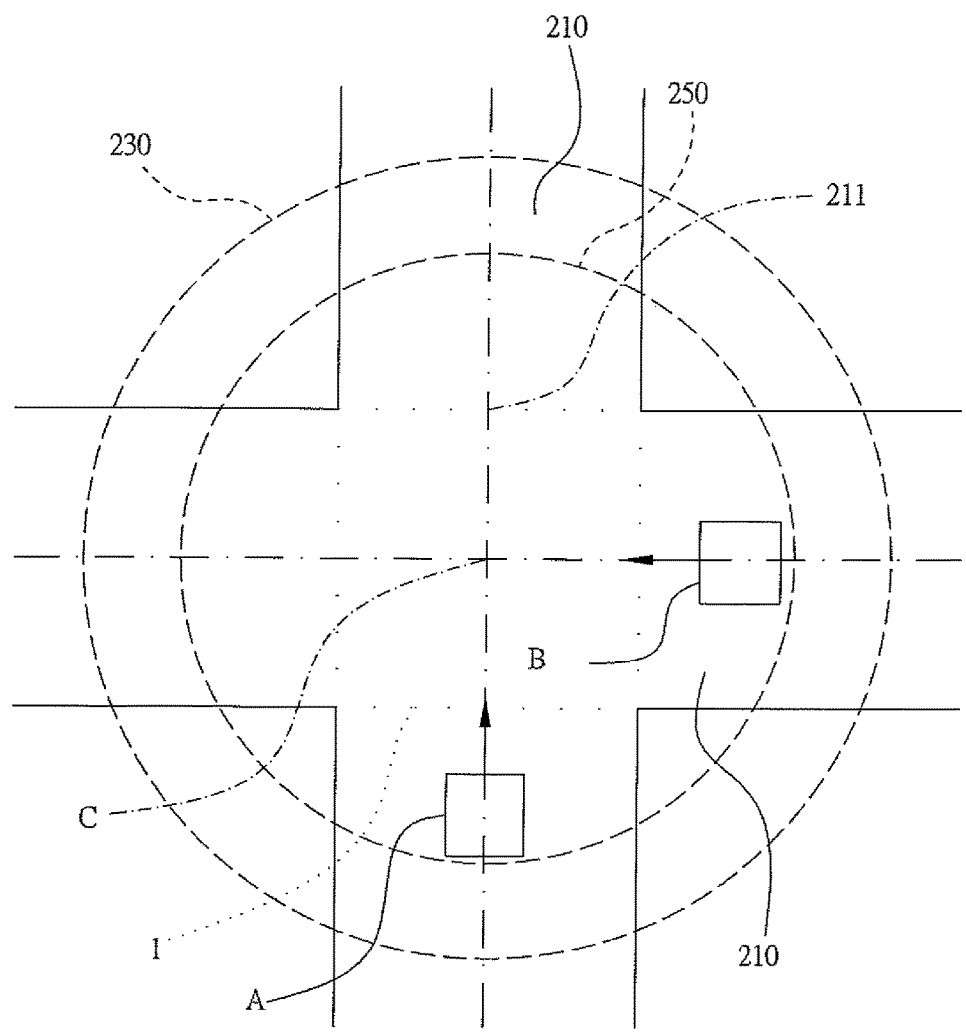
FIG. 4 is a schematic diagram showing two autonomous vehicles traveling toward a road intersection, in which both autonomous vehicles are located in an broadcasting circle, according to an embodiment of the present invention.

Please refer to FIG. 2 together with FIG. 4. FIG. 4 is a schematic diagram showing two autonomous vehicles A and B traveling toward the road intersection I, in which both autonomous vehicles A and B are located in an broadcasting circle, according to an embodiment of the present invention. In a situation that the autonomous vehicle A has also entered the broadcasting circle 250, which means that both the autonomous vehicle A and the autonomous vehicle B are located in the broadcasting circle 250 and advancing toward the road intersection I, step S910 is performed. The autonomous vehicle A starts broadcasting its traffic information to the air, and the autonomous vehicle B starts receiving that traffic information broadcasted from the autonomous vehicle A via its communication modules 130. Then, both of the autonomous vehicle A and the autonomous vehicle B determine who to pass through the road intersection I first according to the traffic information received from each other (step S911a and step S911b).

Particularly, in step S911b, while the computer 110 of the autonomous vehicle B determined to let the autonomous vehicle A pass the road intersection I first after analyzing the traffic information of the autonomous vehicle A, the autonomous vehicle B stops before the road intersection I until the autonomous vehicle A has passed the road intersection (step S913). Contrarily, while the computer 110 of the autonomous vehicle B determined to pass the road intersection I first after analyzing the traffic information of the autonomous vehicle A, the autonomous vehicle B goes straight ahead to pass the road intersection I (step S915). For the autonomous vehicle A, likewise, in step S911a, while its computer 110 determines to let the autonomous vehicle B pass the road intersection I first after analyzing the traffic information of the autonomous vehicle B, the autonomous vehicle A stops before the road intersection I until the autonomous vehicle B has passed the road intersection (step S917). While the computer 110 of the autonomous vehicle A determines to pass the road intersection I first after analyzing the traffic information of the autonomous vehicle B, the autonomous vehicle A advances further to pass the road intersection I (step S919).

Figure 5:
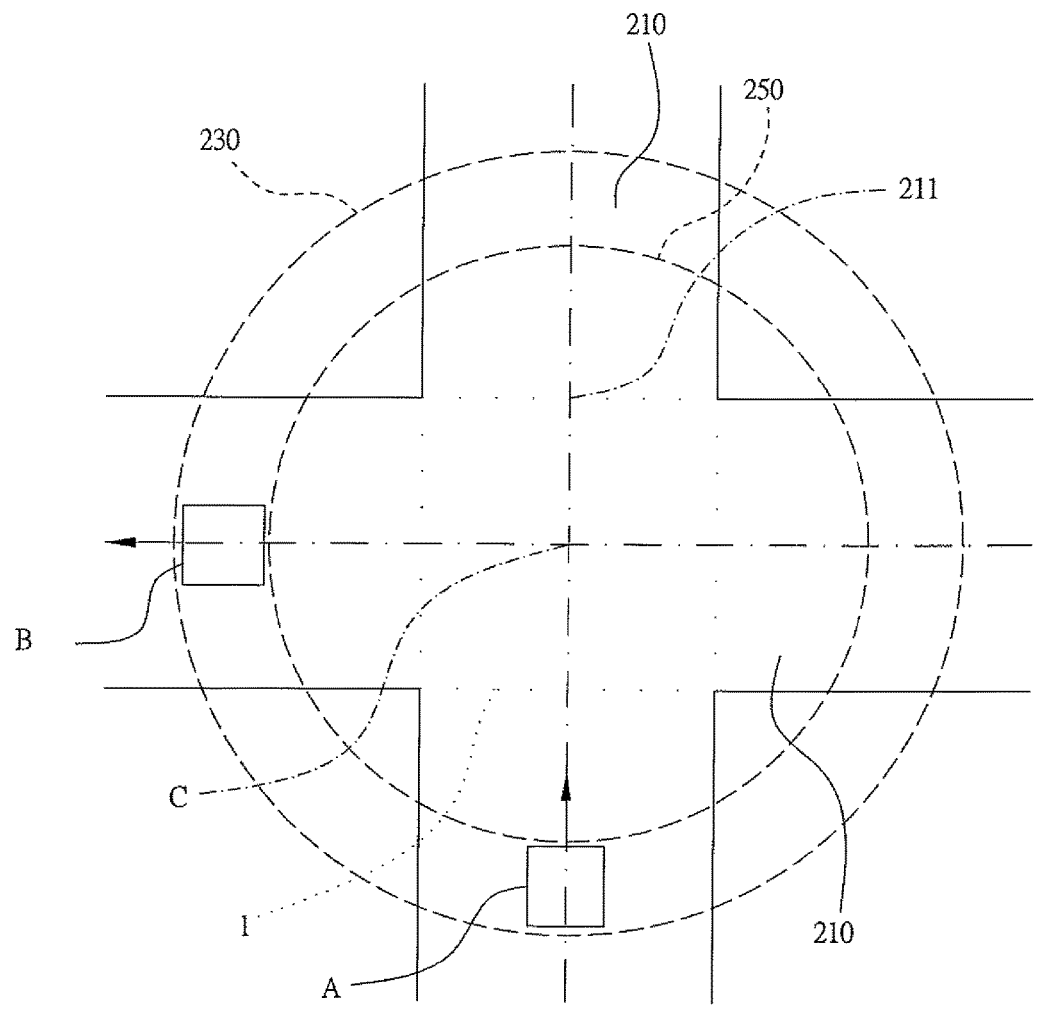
FIG. 5 is a schematic diagram showing one of two autonomous vehicles leaving an broadcasting circle circling a road intersection, according to an embodiment of the present invention.

As mentioned above, stopping an autonomous vehicle before the road intersection I to wait for one another autonomous vehicle to pass through the road intersection I may be stopped at the edge of the broadcasting circle. The waiting autonomous vehicle may move forward again when the other autonomous vehicle has passed through the road intersection I. Again, there are lots of ways to determine when to move again after the other autonomous vehicle has passed through the road intersection I. In some embodiments, the traffic information broadcasted from one autonomous vehicle is received by one another autonomous vehicle and processed by its computer 110. The other autonomous vehicle may continue moving once the most rear side of the autonomous vehicle leaves the road intersection I. For another instance, after one autonomous vehicle passes through the road intersection I and leaves the broadcasting circle 250, it stops broadcasting (see FIG. 5). Under this scenario, one another autonomous vehicle no longer receives traffic information from that autonomous vehicle, thus determining that that autonomous vehicle no longer exists so as to continue advancing.

In addition, the computer 110 of one autonomous vehicle may determine which autonomous vehicle passes through the road intersection I first by not only comparing the times left before each of the autonomous vehicles reach the road intersection I, but comparing the distances left before each of the autonomous vehicles reach the road intersection I. For instance, if one autonomous vehicle is closer to the road intersection I than one another autonomous vehicle, that autonomous vehicle passes first, where the other autonomous vehicle stays before the road intersection I until that autonomous vehicle has passed through the road intersection I.

Figure 6:
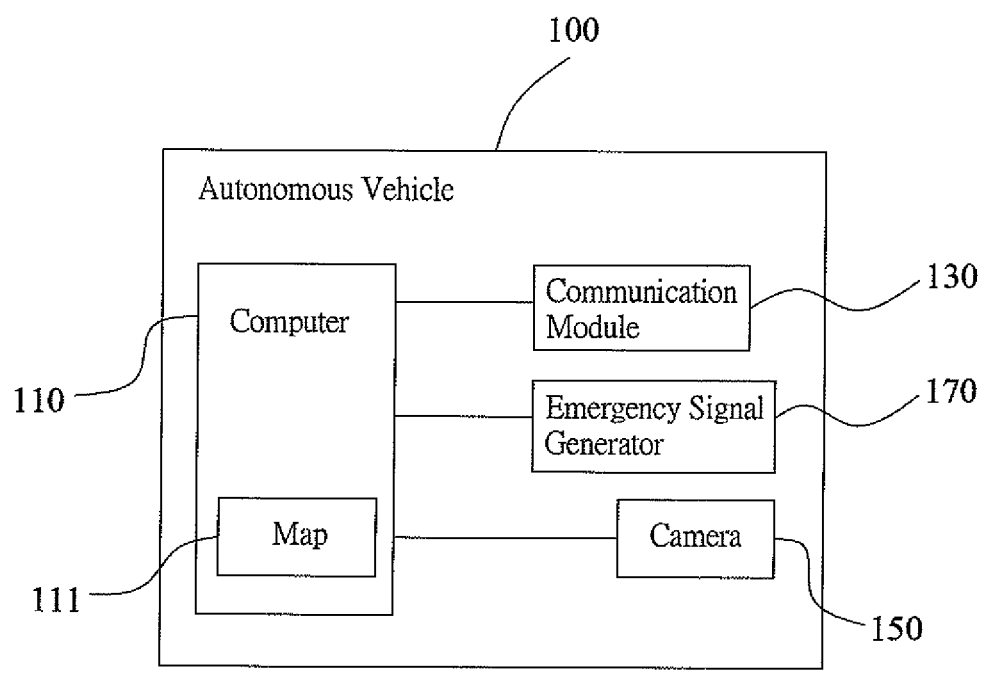
FIG. 6 is a schematic diagram illustrating an autonomous vehicle used for emergency purposes according to an embodiment of the present invention.

In some embodiments, for autonomous vehicles used for special purposes, such as autonomous ambulances or autonomous police cars that rush on the road and into road intersections with top priority, an emergency signal generator 170 may be included in those kinds of autonomous vehicles (see FIG. 6). The emergency signal generator 170 can be activated in any emergency situations for broadcasting emergency signals via its communication module 130. While all autonomous vehicles traveling on the road and toward a road intersection receive the emergency signal, they stop before the road intersection that they were traveling to. In an alternative embodiment, they may all stop right where they are once a broadcasted signal has been detected.

The method for at least two autonomous vehicles to safely pass through a road intersection of the present invention has following advantages:

Firstly, by defining an imaginary broadcasting circle on a map installed in a computer of autonomous vehicle, the method keeps the radio band use to minimum. Additionally the energy is preserved.

Secondly, the decision of proceed/wait at a road intersection is determined by each autonomous vehicle and not relying on any central station or handshaking between the two autonomous vehicles, therefore minimum components are required.

Lastly, the method may be widely applied to autonomous vehicles used for special purposes that need emergency priority on road, especially in an enclosed area.

The description of the invention including its applications and advantages as set forth herein is illustrative and is not intended to limit the scope of the invention, which is set forth in the claims. Variations and modifications of the embodiments disclosed herein are possible, and practical alternatives to and equivalents of the various elements of the embodiments would be understood to those of ordinary skill in the art upon study of this patent document. For example, specific values given herein are illustrative unless identified as being otherwise, and may be varied as a matter of design consideration. Terms such as "first" and "second" are distinguishing terms and are not to be construed to imply an order or a specific part of the whole. These and other variations and modifications of the embodiments disclosed herein, including of the alternatives and equivalents of the various elements of the embodiments, may be made without departing from the scope and spirit of the invention, including the invention as set forth in the following claims.

What is claimed is:

1. A method for at least two autonomous vehicles to safely pass through a road intersection, the location of the road intersection stored in a map installed in a computer of each of the autonomous vehicles, each of the computers of the autonomous vehicles having a communication module capable of broadcasting and receiving traffic information, the road intersection where a plurality of roads meet, the method comprising:
providing an information receiving circle in each of the maps circling the road intersection;
providing a broadcasting circle in each of the maps circling the road intersection, wherein each of the broadcasting circles is circled by each of the information receiving circles in each of the maps concentrically;
traveling all autonomous vehicles toward the road intersection and into the information receiving circle;
traveling a first of the autonomous vehicles further into the broadcasting circle for broadcasting traffic information via the computer thereof;
receiving traffic information broadcasted by the first autonomous vehicle traveling in the broadcasting circle by the computer of a second of the at least two autonomous vehicles; and
determining which autonomous vehicle passes through the road intersection first according to the traffic information broadcasted by the first autonomous vehicle, and received by the computer of the second autonomous vehicle,
wherein when the computer of the second autonomous vehicle makes a determination to let the first autonomous vehicle pass first, the second autonomous vehicle stops before the intersection until the first autonomous vehicle has passed through the road intersection.

2. The method as claimed in claim 1, wherein the traffic information includes at least one of position information, vehicle length, traveling speed information, and traveling direction information.

3. The method as claimed in claim 2, wherein the position information is obtained via global positioning system or triangulation.

4. The method as claimed in claim 1, wherein the computer of the second autonomous vehicle determines which autonomous vehicle passes through the road intersection first by comparing the times left before each of the autonomous vehicles reaches the road intersection, when the time left before entering the road intersection of the first autonomous vehicle is shorter than the time left before entering the road intersection of the second autonomous vehicle, the computer of the second autonomous vehicle determines to stop before the road intersection to let the first autonomous vehicle pass first.

5. The method as claimed in claim 1, wherein when the second autonomous vehicle travels into the broadcasting circle before the first autonomous vehicle enters the road intersection, the second autonomous vehicle broadcasts traffic information thereof, the first autonomous vehicle receives the traffic information of the second autonomous vehicle, and the computers of both the first and second autonomous vehicles determine which to travel through the road intersection first according to the traffic information of both the first and second autonomous vehicles.

6. The method as claimed in claim 5, wherein the computer of the second autonomous vehicle determines which autonomous vehicle passes through the road intersection first by comparing the distances left before each of the autonomous vehicles reaches the road intersection, when the distance left before entering the road intersection of the first autonomous vehicle is shorter than the distance left before entering the road intersection of the other autonomous vehicle, the computer of the second autonomous vehicle determines to stop before the road intersection to let the first autonomous vehicle pass first.

7. The method as claimed in claim 2, wherein when the computer of the first autonomous vehicle determines to let the second autonomous vehicle pass first, the autonomous vehicle stops before the intersection until the most rear side of the first autonomous vehicle has left the intersection, which is calculated by the computer of the second autonomous vehicle according to the traffic information including the speed and the length of the first autonomous vehicle.

8. The method as claimed in claim 1, further comprising stopping the second autonomous vehicle before the road intersection if an emergency signal has been broadcasted from the first autonomous vehicle.

9. The method as claimed in claim 1, wherein both the broadcasting circle and the information receiving circle are concentric with the center of the road intersection.

10. The method as claimed in claim 9, wherein each of the plurality of roads has a middle line, the center of the road intersection is where at least two of the middle lines meet.

11. The method as claimed in claim 1, wherein when the computer of the second autonomous vehicle determines to let the first autonomous vehicle pass first, the second autonomous vehicle stops at the edge of broadcasting circle until the first autonomous vehicle has passed through the road intersection.

12. The method as claimed in claim 11, wherein the second autonomous vehicle stops at the edge of broadcasting circle until the first autonomous vehicle leaves the broadcasting circle and stops broadcasting the traffic information thereof.

13. The method as claimed in claim 1, wherein each of the at least two autonomous vehicles has a camera connected to the computer, when the computer detects an obstacle blocking in front of any of the at least two autonomous vehicles, the computer determines to stop the autonomous vehicle immediately until the obstacle is no longer detected.

14. The method as claimed in claim 1, wherein the sizes of the broadcasting circle and the information receiving circles vary upon the speed of the autonomous vehicle.

15. The method as claimed in claim 1, wherein the traffic information of the autonomous vehicle is broadcasted via infrared, direct-broadcast satellite, Wi-Fi, Bluetooth, 4G communication, or 3G communication.

16. The method as claimed in claim 5, wherein the broadcasting of the autonomous vehicle stops when the autonomous vehicle leaves the broadcasting circle.

17. A system for at least two autonomous vehicles to safely pass through a road intersection, the system applicable to a plurality of roads that meet at the road intersection, the system comprising:
the at least two autonomous vehicles travelling on different roads toward the road intersection, respectively, wherein each of the autonomous vehicles includes:
a computer;
a communication module connected to the computer;
a map stored in the computer, wherein the location of the road intersection is stored in the map, the map indicates an information receiving circle and a broadcasting circle circled by the information receiving circle concentrically, the road intersection is circled by the broadcasting circle;
wherein a first of the at least two autonomous vehicles travels into the broadcasting circle and begins broadcasting traffic information via the communication module connected to the computer thereof, the communication module of a second autonomous vehicle of the at least two autonomous vehicles receives the traffic information broadcast by the first autonomous vehicle,
wherein the computer of the second autonomous vehicle determines which autonomous vehicle passes through the road intersection first according to the traffic information broadcast by the first autonomous vehicle, and when the computer of the second autonomous vehicle determines to let the first autonomous vehicle pass first, the second autonomous vehicle stops before the intersection until the first autonomous vehicle has passed through the road intersection.

18. The system as claimed in claim 1, wherein the traffic information includes at least one of positioning information, vehicle length, traveling speed information, and traveling direction information, wherein the position information is defined by global positioning system or triangulation.

19. The system as claimed in claim 18, wherein the computer of the second autonomous vehicle determines which autonomous vehicle passes through the road intersection first by comparing the times left before each of the autonomous vehicles reaches the road intersection, when the time left before entering the road intersection of the first autonomous vehicle is shorter than the time left before entering the road intersection of the second autonomous vehicle, the computer of the second autonomous vehicle determines to stop before the road intersection to let the first autonomous vehicle pass first.

20. The method as claimed in claim 18, wherein when the second autonomous vehicle travels into the broadcasting circle before the first autonomous vehicle enters the road intersection, the second autonomous vehicle broadcasts traffic information via the communication module thereof, the first autonomous vehicle receives the traffic information of the second autonomous vehicle via the communication module thereof, and the computers of both the autonomous vehicles determine which to travel through the road intersection first according to the traffic information of both the autonomous vehicles.

* * * * *